Patented Aug. 27, 1929.

1,726,066

UNITED STATES PATENT OFFICE.

PAUL HAEDRICH, OF DUISBURG-WANHEIM, AND OTTO KIPPE, OF OSNABRUECK, GERMANY, ASSIGNORS TO METALLGESELLSCHAFT AKTIENGESELLSCHAFT, OF FRANKFORT-ON-THE-MAIN, GERMANY.

PROCESS OF CONVERTING TIN ORES INTO THE FORM OF PIECES.

No Drawing. Application filed August 3, 1927, Serial No. 210,451, and in Germany August 9, 1926.

This invention relates to a process of converting tin ores into the form of pieces.

Tin ores which come into consideration for the smelting of tin are finely granular or pulverulent by nature or owing to their preparation and are therefore badly adapted for metallurgical treatment. For this reason the conversion of these pulverulent tin ores into the form of pieces is exceedingly important for the metallurgical treatment.

The invention solves this problem by admixing fine light tin oxide such for example as is obtained in practice during the treatment of tin slags or ores poor in tin by volatilization in furnaces and separation in filters. By admixing about 10% or more of such tin oxide in a dry state or in the form of a sludge and preferably about 5% of dry slaked lime to the finely granular tin ores there is obtained a useful mass which when compacted in briquette presses immediately yields a transportable durable briquette which can be submitted to metallurgical treatment without any difficulty, if desired after drying.

The surprisingly good binding power of tin oxide in combination with calcium compounds is apparently due to the fact that the colloidal tin oxide combines with the calcium compound, for instance, calcium hydrate to form calcium stannate.

It has already been proposed to make briquettes from a paste consisting of tin oxide, slag, alkali-metal compounds and calcium compounds. The alkali-metal compounds are admixed in order to decompose the silicates present in the slag; the colloidal silica produced then combines with the calcium compounds to calcium silicates, which effect the hardening of the moulded bodies or briquettes.

According to the present invention it is not tin oxide, which is to be converted into the form of pieces; tin oxide is only used as binding agent for more or less finely granulated tin ores. The briquettes therefore mainly consist of tin ores cemented by comparatively small amounts of tin oxide in combination with calcium hydrate.

Alkali-metal compounds should if possible not be present in the briquettes made according to the invention, as they reduce the hardness and the capability of resisting weather and fire and are of disadvantage for the metallurgical treatment of the briquettes.

The new process of converting fine tin ores into the form of pieces by means of tin oxide has the double advantage that not only the fine tin ores but also the tin oxide are transformed into a form suitable for metallurgical treatment.

A further advantage of the briquettes made according to the invention is their high content of tin, which naturally is not obtained when materials poor in tin or containing no tin are used as binding agents.

In lieu of calcium compounds there may be added to the tin oxide, compounds of other alkaline earth metals, alumina, magnesia or mixtures of these materials. In the same manner oxides or hydroxides of some other heavy metals such as iron may be used. But these materials should always be selected to aim at favouring the subsequent metallurgical process or at least not disturbing the same.

*Example.*—Tin ore, raw or roasted, or a mixture of raw ore and roasted ore in any desired proportions is mixed in a mixer with 7 to 15% tin oxide and 4 to 6% calcium hydrate. Any good mixer may be used for this purpose. If desirable water may be added to this mixture, which is then pressed in any of the mechanical or hydraulic presses. Especially adapted are presses with rotating press boards working at pressures between 400 and 500 atmospheres. The obtained briquettes are then dried in drying ovens and have when dry a high strength similar to that of stones made from blast furnace slag. The addition of water to the mix is advantageous but not necessary. The briquettes made with the use of water are harder and more durable than those made without water. With certain ores the addition of about 7% of water has been found to be advantageous.

What we claim is:

1. A method for converting granular tin ores into the form of pieces which consists in pressing mixtures of tin ore and highly dispersed tin oxide.

2. A method for converting granular tin ores into the form of pieces which consists in pressing mixtures of tin ore, highly dispersed tin oxide and alkaline earth metal compounds.

3. A method for converting granular tin ores into the form of pieces which consists in pressing mixtures of tin ore, highly dispersed tin oxide and calcium compounds.

4. A method for converting granular tin ores into the form of pieces which consists in pressing mixtures of tin ore, highly dispersed tin oxide and calcium hydrate.

5. A method for converting granular tin ores into the form of pieces which consists in pressing mixtures of tin ore, highly dispersed tin oxide and calcium hydrate in presses working at pressures between 400 and 500 atmospheres.

6. As a new article of manufacture briquettes consisting of tin ore and highly dispersed tin oxide.

7. As a new article of manufacture briquettes consisting of tin ore, highly dispersed tin oxide and alkaline earth metal compounds.

8. As a new article of manufacture briquettes consisting of tin ore, highly dispersed tin oxide and calcium compounds.

9. As a new article of manufacture briquettes consisting of tin ore, highly dispersed tin oxide and calcium hydrate.

In testimony whereof we affix our signatures.

Dr. OTTO KIPPE.
PAUL HAEDRICH.